US012812051B2

(12) United States Patent
Nguyen

(10) Patent No.: US 12,812,051 B2
(45) **Date of Patent: *Nov. 24, 2026**

(54) SHEET CONVEYING DEVICE CONVEYING SHEET

(71) Applicant: KYOCERA Document Solutions Inc., Osaka (JP)

(72) Inventor: Thang Duc Nguyen, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 312 days.

This patent is subject to a terminal disclaimer.

(21) Appl. No.: 18/611,834

(22) Filed: Mar. 21, 2024

(65) Prior Publication Data

US 2024/0333850 A1 Oct. 3, 2024

(30) Foreign Application Priority Data

Mar. 31, 2023 (JP) ................................ 2023-057307

(51) Int. Cl.

| | |
|---|---|
| ***H04N 1/04*** | (2006.01) |
| ***B65H 5/06*** | (2006.01) |
| ***H04N 1/00*** | (2006.01) |
| ***H04N 1/028*** | (2006.01) |

(52) U.S. Cl.

CPC ........... *H04N 1/00588* (2013.01); *B65H 5/06* (2013.01); *H04N 1/00559* (2013.01); *H04N 1/028* (2013.01); *B65H 2403/481* (2013.01); *B65H 2403/514* (2013.01); *B65H 2801/03* (2013.01)

(58) Field of Classification Search

USPC ........ 358/496, 498, 461, 494, 474; 399/367, 399/364

See application file for complete search history.

(56) References Cited

U.S. PATENT DOCUMENTS 8,317,192 B2 * 11/2012 Karikusa .................. B65H 9/06 271/245
8,335,021 B2 * 12/2012 Tanaka ................ H04N 1/1245 358/461

(Continued)

FOREIGN PATENT DOCUMENTS

CN 108353109 A 7/2018
JP 2019140446 A 8/2019

*Primary Examiner* — Cheukfan Lee

(74) *Attorney, Agent, or Firm* — IP Business Solutions, LLC.

(57) ABSTRACT

A sheet conveying device includes a drive device, a conveyance device, an optical unit, a white reference member, and a transmission device. The drive device generates a driving force. The conveyance device conveys a sheet by a rotary driving force of the drive device. The optical unit includes an image reading unit that extends in a longitudinal direction thereof along a widthwise direction orthogonal to a direction of conveyance of the sheet, applies light to the sheet, and reads light reflected from the sheet with an image sensor. The white reference member extends in the longitudinal direction of the image reading unit and is read by the image reading unit. The transmission device transmits the driving force generated by the drive device to rock the optical unit in the widthwise direction. The transmission device includes a rocking member that rocks the optical unit in a longitudinal direction thereof.

7 Claims, 15 Drawing Sheets

(56) References Cited

U.S. PATENT DOCUMENTS

| | | | | |
|---|---|---|---|---|
| 8,614,839 | B2 * | 12/2013 | Sano | H04N 1/00774<br>358/461 |
| 8,928,951 | B2 * | 1/2015 | Utsunomiya | H04N 1/00572<br>358/461 |
| 9,261,820 | B2 * | 2/2016 | Wakayama | G03G 21/0005 |
| 2018/0103168 | A1 * | 4/2018 | Sakuma | H04N 1/0066 |
| 2018/0234578 | A1 * | 8/2018 | Okawa | H04N 1/1017 |
| 2018/0262646 | A1 * | 9/2018 | Gotoh | G06T 1/00 |
| 2025/0227182 | A1 * | 7/2025 | Horiguchi | G03G 15/228 |

* cited by examiner

SHEET CONVEYING DEVICE CONVEYING SHEET

INCORPORATION BY REFERENCE

This application claims priority to Japanese Patent Application No. 2023-057307 filed on Mar. 31, 2023, the entire contents of which are incorporated by reference herein.

BACKGROUND

The present disclosure relates to sheet conveying devices.

There is known an image reading device that performs shading compensation with high accuracy, for example, by moving a white reference member a specified amount in a main scanning direction in conjunction with rotation of a conveyance drive roller conveying a sheet, reading an image of the white reference member several times with an image sensor during the movement of the white reference member to read different locations on the white reference member, and averaging sets of white reference data obtained by the reading at the different locations to acquire accurate white reference data even in the presence of dirt somewhere on the reading surface of the white reference member.

SUMMARY

A technique improved over the aforementioned technique is proposed as one aspect of the present disclosure.

A sheet conveying device according to an aspect of the present disclosure includes a drive device, a conveyance device, an optical unit, a white reference member, and a transmission device. The drive device generates a driving force. The conveyance device conveys a sheet by a rotary driving force of the drive device. The optical unit includes an image reading unit that extends in a longitudinal direction thereof along a widthwise direction orthogonal to a direction of conveyance of the sheet, applies light to the sheet, and reads light reflected from the sheet with an image sensor. The white reference member extends in the longitudinal direction of the image reading unit and is read by the image reading unit. The transmission device transmits the driving force generated by the drive device to rock the optical unit in the widthwise direction. The transmission device includes a rocking member that rocks the optical unit in a longitudinal direction of the optical unit.

DETAILED DESCRIPTION

Figure 1:
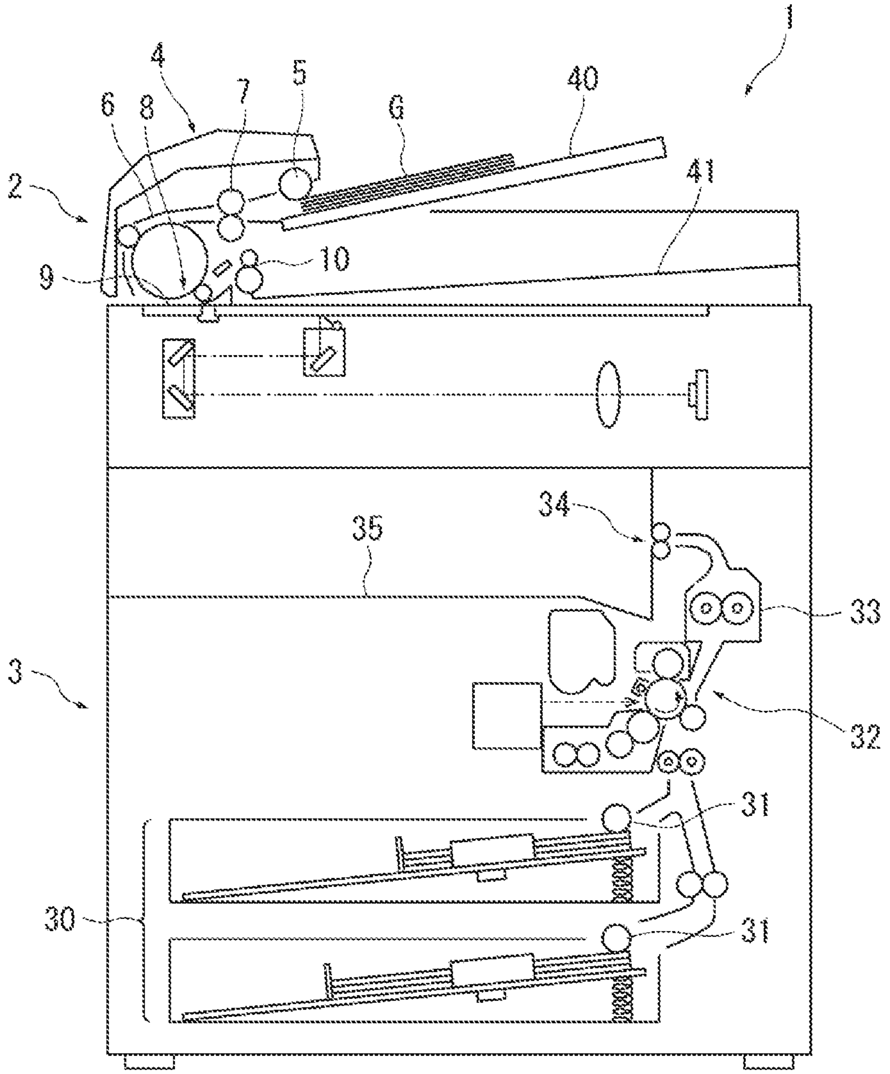
FIG. 1 is a view showing the structure of a multifunction peripheral including a sheet conveying device according to an embodiment.

Hereinafter, a description will be given of a sheet conveying device according to an embodiment as an aspect of the present disclosure with reference to the drawings. Throughout the drawings, the same or equivalent parts and components are designated by the same reference characters and further description is omitted.

First, a multifunction peripheral 1 will be described with reference to FIG. 1. As shown in FIG. 1, the multifunction peripheral 1 acquires image data from an original document or acquires image data from an external server, a cloud or a terminal. The multifunction peripheral 1 forms an image on a sheet based on the image data and outputs the sheet. The multifunction peripheral 1 is an apparatus in which a function to transmit and receive image data, a function to read images, and a function to form images are combined. The multifunction peripheral 1 has multiple functions including, as an example, a scanner, a printer, a copier, a telephone, a printer, and a facsimile machine.

The cloud is a form of utility that provides computer resources via a computer network, such as the Internet, and includes, as an example, an application, a platform, and an infrastructure.

The server stores data and, upon request via a communication line, provides a requested piece of data.

The multifunction peripheral 1 includes a document reading apparatus 2 and an image forming apparatus 3.

First, the image forming apparatus 3 will be described with reference to FIG. 1. The image forming apparatus 3 shown in FIG. 1 forms an image on a sheet.

The image forming apparatus 3 includes a sheet tray 30, a sheet feed roller 31, an image forming device 32, a fixing device 33, a sheet output roller 34, and a sheet output tray 35.

The sheet tray 30 accommodates sheets. The sheet feed roller 31 picks up and feeds a sheet from the sheets accommodated in the sheet tray 30.

The image forming device 32 forms an image on a sheet by toner or ink. In the case where the image forming apparatus 3 forms an image electrophotographically, the image forming device 32 includes a photoconductor, a charging device, an exposure device, a developing device, a transfer device, a cleaning device, and a destaticizing device.

An example of the photoconductor is a photoconductive drum. The photoconductive drum has a photosensitive layer on the peripheral surface. Examples of the photoconductive drum include a selenium drum and an OPC (organic photoconductor).

The charging device charges the photosensitive layer of the photoconductor to a predetermined potential. An example of the charging device is a corona discharger.

The exposure device irradiates the photosensitive layer of the photoconductor with laser light to expose it to the laser light. The exposure device exposes the photosensitive layer of the photoconductor to light based on image data. As a result, an electrostatic latent image is formed on the photoconductor. An example of the exposure device is an LED (light-emitting diode).

The developing device contains, as an example, a two-component developer containing a carrier made of a magnetic material and a toner. The developing device develops by the toner the electrostatic latent image formed on the photoconductor, thus forming a toner image on the photoconductor. The transfer device transfers the toner image on the photoconductor to a sheet. The cleaning device cleans up residual toner remaining on the photoconductor after the transfer. The destaticizing device removes electrostatic charge from the photoconductor.

The fixing device 33 applies heat and pressure to the toner image developed on the sheet to fix the toner image on the sheet. The fixing device 33 includes, for example, a fixing roller, a heater, and a pressing roller.

The fixing roller is a hollow cylindrical roller. The fixing roller is pressed against the pressing roller. The pressing roller and the fixing roller form a nip between them. The pressing roller is driven into rotation by an unshown drive device and forms a nip together with the fixing roller to rotate the fixing roller.

The heater is supplied with power from an unshown power source to apply heat to the fixing roller. The heater is disposed in proximity to an inner peripheral surface of the fixing roller. The sheet conveyed to the fixing device 33 is heated by the heater when passing through the nip and, thus, the toner image is fixed on the sheet.

A sheet output device ejects the sheet to the outside of a body of the image forming apparatus 3. The sheet output device includes the sheet output roller 34 and the sheet output tray 35. The sheet output roller 34 ejects to the sheet output tray 35 the sheet conveyed from the fixing device 33 by the sheet conveying device. The sheet output tray 35 accommodates ejected sheets.

Although FIG. 1 shows as an example an electrophotographic image forming apparatus 3, the image formation system of the image forming apparatus 3 may be an ink-jet system. The structure of an image forming apparatus using an ink-jet system will be described below. In the case where the image forming apparatus 3 is an inkjet printer, the image forming device 32 includes an ink cartridge, an ink tank, a pump, a head, nozzles, an electrode, and a conveying belt.

The ink cartridge and the ink tank store, as an example, different types of water-based inks of different colors: Y (yellow). M (magenta), C (cyan), and Bk (black).

The pump supplies ink from the ink tank to the head.

Multiple nozzles forming pixels are disposed on the head. Based on image data, ink of color according to the image data is supplied from the ink tank to the head. The ink is discharged through the nozzles toward a sheet.

The electrode includes, as an example, a charging electrode and a deflection electrode. The charging electrode applies charge to the ink discharged from the nozzles. The deflection electrode controls the direction of flight of the charged ink.

The conveying belt is opposed to the nozzles of the head and conveys a sheet. Image is formed, by the ink discharged from the nozzles of the head, on the sheet being conveyed by the conveying belt. In the case where the image forming apparatus 3 is an inkjet printer, no fixing device is needed.

Figure 2:
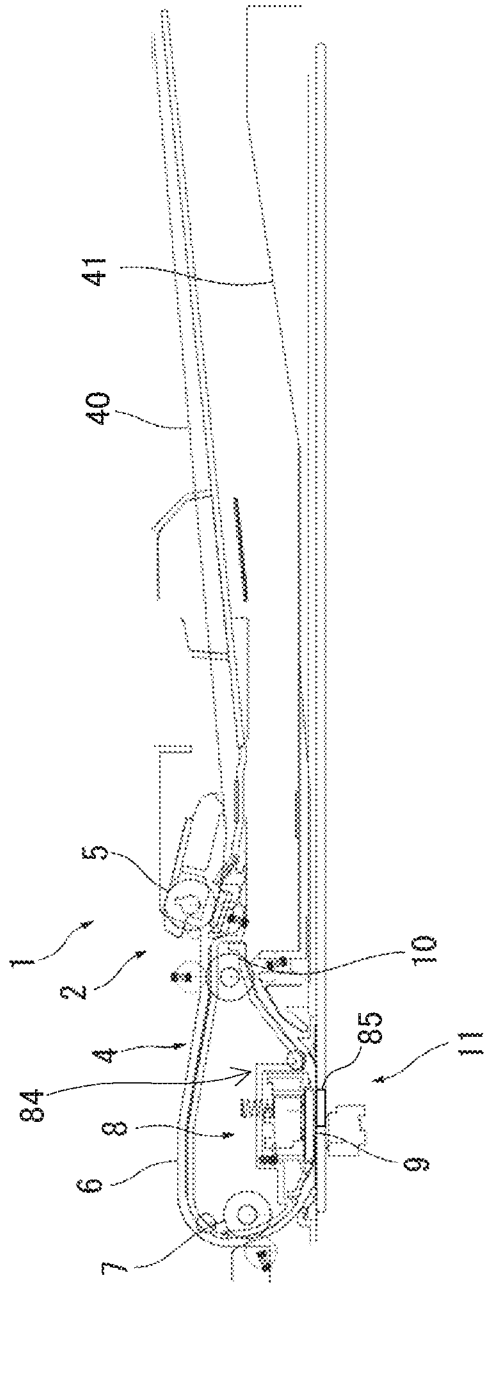
FIG. 2 is a view showing the sheet conveying device according to the embodiment.

Next, the document reading apparatus 2 will be described with reference to FIG. 1 as well as FIG. 2. FIG. 2 is a view showing a sheet conveying device 8 according to an embodiment of the present disclosure.

The document reading apparatus 2 shown in FIGS. 1 and 2 reads an image described on an original document and outputs information on the image. The document reading apparatus 2 includes, for example, an optical unit 84 (described hereinafter) including a scanner. Furthermore, the document reading apparatus 2 includes a document sheet conveying device, for example, an ADF (auto document feeder).

The document reading apparatus 2 includes a document sheet conveying device 4, a document feed roller 5, a document conveyance path 6, a document conveyance roller 7, a sheet conveying device 8, and a document conveyance roller 10.

The document reading apparatus 2 reads an image from an original document G and generates image data based on the read image. The document sheet conveying device 4 feeds the original document G. The document sheet conveying device 4 includes a feed tray 40 and an ejection tray 41. The feed tray 40 accommodates original documents G. The ejection tray 41 accommodates original documents G from which images have been read and which have then been ejected to the ejection tray 41.

The document feed roller 5 picks up and feeds an original document G on the feed tray 40. The document conveyance path 6 includes the document feed roller 5 disposed therein and allows the document sheet fed by the document feed roller 5 to be conveyed therealong. The document conveyance roller 7 is also disposed in the document conveyance path 6 and conveys the original document G along the document conveyance path 6.

The sheet conveying device 8 is disposed in the document conveyance path 6. The sheet conveying device 8 further conveys the original document G conveyed along the document conveyance path 6 by the document conveyance roller 7. In the sheet conveying device 8, the image of the original document G being conveyed is read by the optical unit 84.

A position at which the image of an original document G is read is referred to as a reading position 9. When the original document G is passing through the reading position 9, the image of the original document G is read by the optical unit 84.

The document conveyance roller 10 is disposed in the document conveyance path 6 and conveys the original document G toward the ejection tray 41.

Next, the sheet conveying device 8 according to this embodiment will be described in detail with reference to, in addition to FIGS. 1 and 2, FIGS. 3 to 10.

Figure 3:
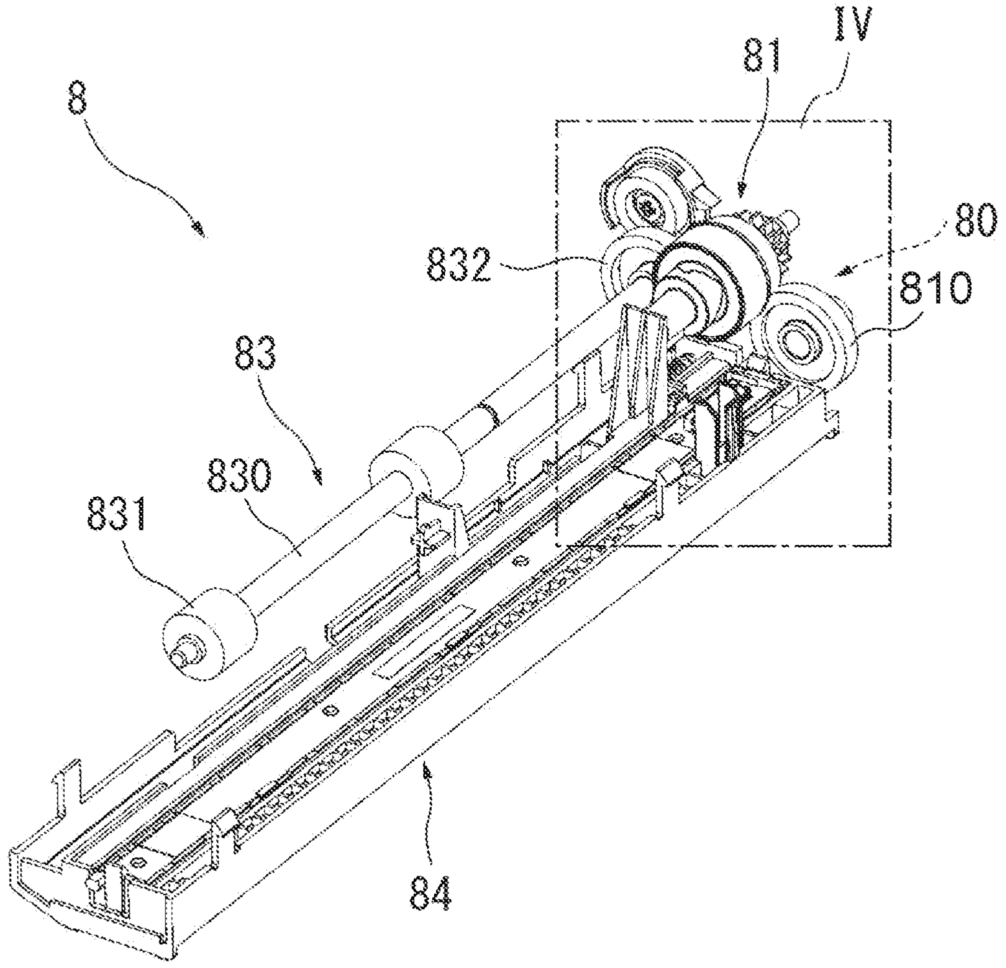
FIG. 3 is a perspective external view showing in magnification the sheet conveying device according to the embodiment.
Figure 4:
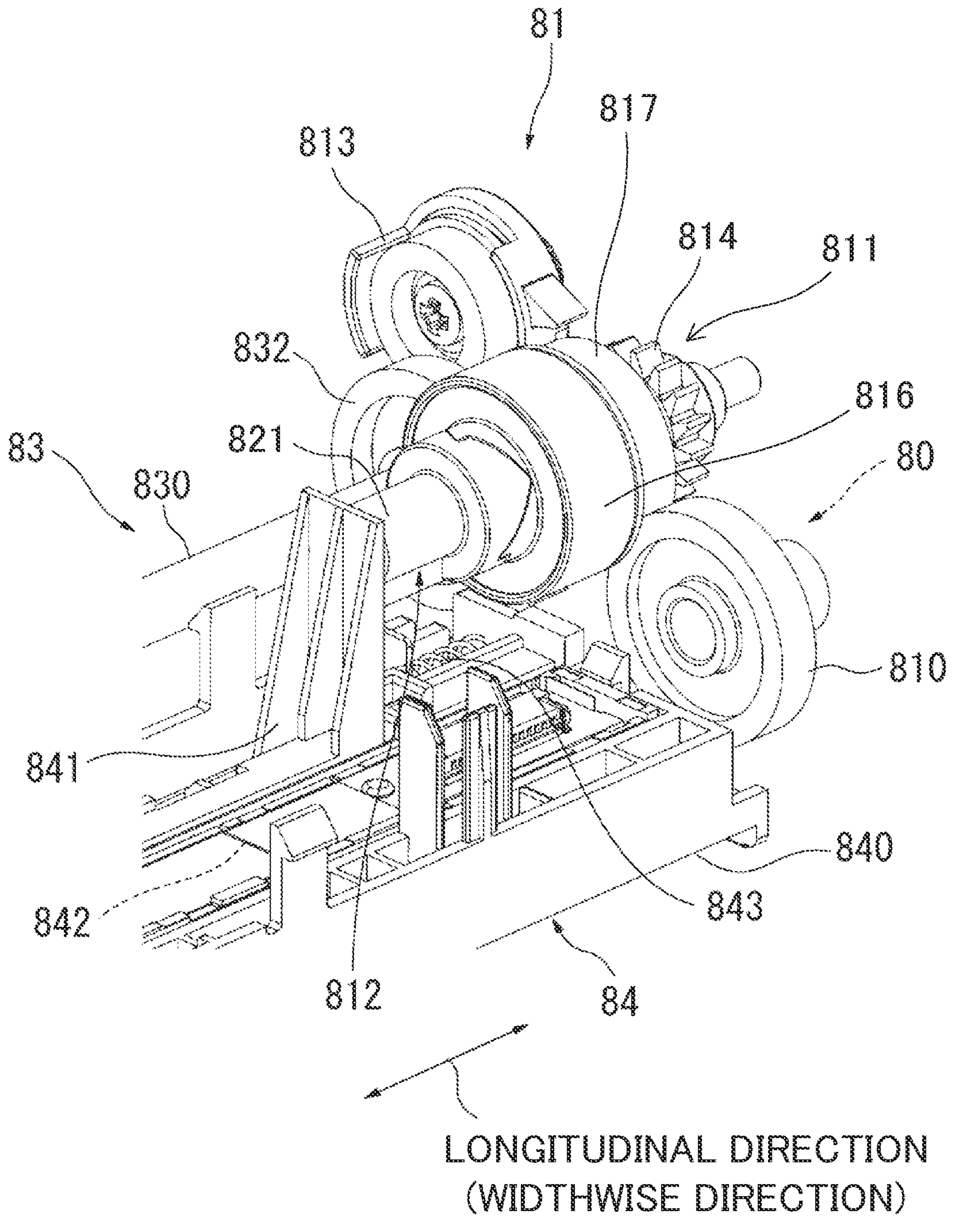
FIG. 4 is a perspective external view showing in magnification a transmission device of the sheet conveying device according to the embodiment.
Figure 7A:
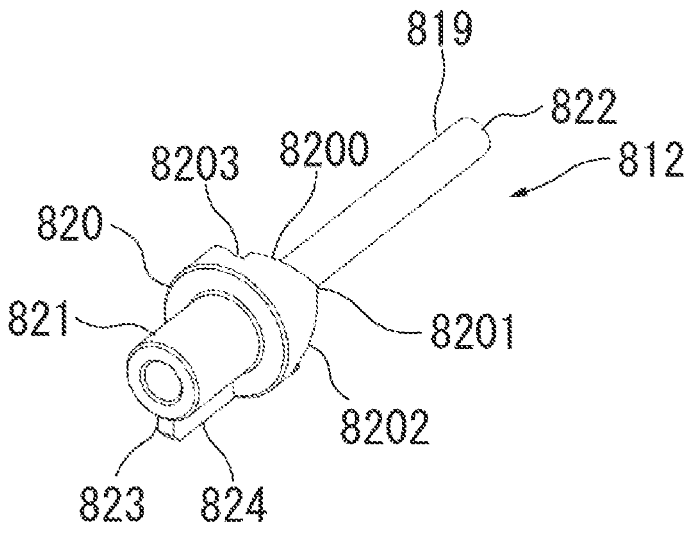
FIGS. 7A and 7B are views showing a rocking member and a spring, respectively.
Figure 7B:
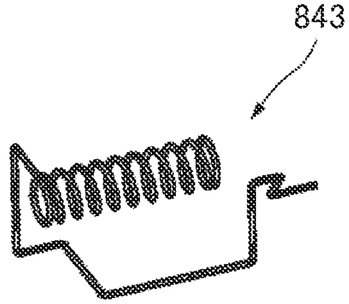
Figure 8:
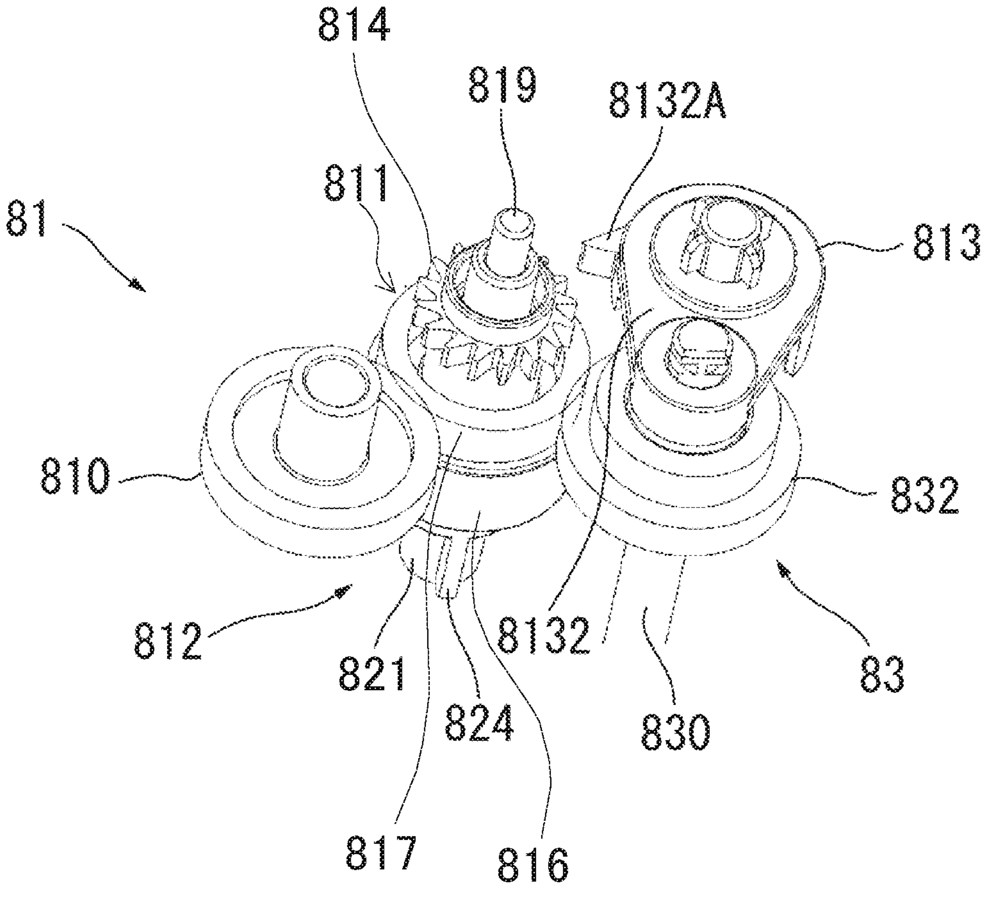
FIG. 8 is a perspective external view showing the structure of the transmission device.
Figure 9A:
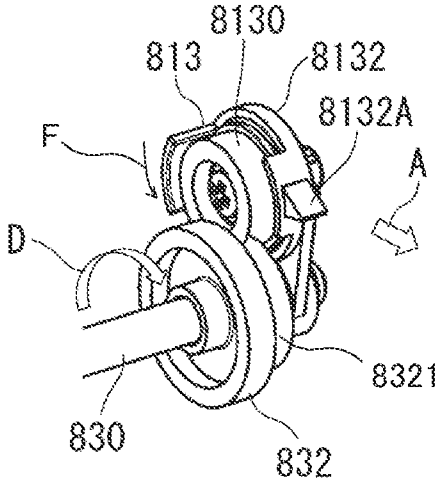
FIGS. 9A and 9B are views for illustrating the movements of a conveying shaft and the lock member.
Figure 9B:
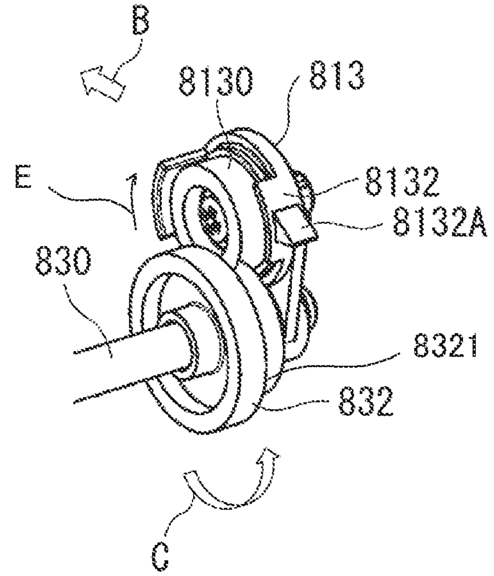

FIG. 3 is a perspective external view showing in magnification the sheet conveying device 8 according to this embodiment. FIG. 4 is a perspective external view showing in magnification a transmission device 81 of the sheet conveying device 8 according to this embodiment. FIG. 4 is an enlarged view of the region IV shown in FIG. 3. FIGS. 5A to 5E are views showing the structure of a planet gear part 811 of the transmission device 81. FIGS. 6A to 6E are views showing the structure of a lock member 813 of the transmission device 81. FIGS. 7A and 7B are views showing a rocking member 812 and a spring 843, respectively. FIG. 8 is a perspective external view of the transmission device 81 as viewed from a different angle from that in FIG. 4. FIGS. 9A and 9B are views for illustrating the movements of a conveying shaft 830 and the lock member 813. FIG. 10 shows the relationship between the lock member 813 and the planet gear part 811 of the transmission device 81.

As shown in FIGS. 3 and 4, the sheet conveying device 8 includes a drive device 80, a transmission device 81, a conveyance device 83, and the optical unit 84.

The drive device 80 includes an unshown motor as an example of a drive source and a drive gear part 810. The drive device 80 supplies through the transmission device 81 a rotary driving force generated by the motor to the conveyance device 83. The drive gear part 810 is provided on a rotary shaft of the motor as a drive source to rotate simultaneously and coaxially with the rotary shaft and is rotated by the rotary driving force of the motor.

The transmission device 81 transmits the rotary driving force generated by the drive device 80 to the conveyance device 83. As shown in FIG. 4, the transmission device 81 includes a planet gear part 811, a rocking member 812, and a lock member 813.

The conveyance device 83 is rotated by the rotary driving force transmitted thereto through the transmission device 81 from the drive device 80 to convey a sheet (an original document G). As shown in FIG. 3, the conveyance device 83 includes a conveying shaft 830, a roller 831, and a lock drive gear part 832.

The conveying shaft 830 is bridged in the widthwise direction of the document conveyance path 6 described with reference to FIGS. 1 and 2 (in a direction orthogonal to the direction of sheet ejection). The conveying shaft 830 is rotated by the rotary driving force derived from the drive device 80 and transmitted to the lock drive gear part 832.

The roller 831 is mounted on the conveying shaft 830 and rotates along with the rotation of the conveying shaft 830 to convey a sheet. By the rotary driving force transmitted from the drive device 80, the lock drive gear part 832 and the conveying shaft 830 are rotated in a direction for the roller 831 to convey the sheet in the direction of sheet ejection. When the drive device 80 transmits to the conveyance device 83 a rotary driving force opposite in the direction of rotation to the above-described rotary driving force, the lock drive gear part 832 and the conveying shaft 830 rotate in the same opposite direction according to the transmitted rotary driving force.

The lock drive gear part 832 rotates in response to the rotary driving force from the drive device 80. The lock drive gear part 832 will be described later in further detail with reference to FIG. 8 and successive figures.

The optical unit 84 shown in FIG. 3 is a functional part including an image reading unit 842 that applies light to a sheet, receives light reflected from the sheet, and generates image data from the received reflected light.

As shown in FIG. 4, the optical unit 84 includes a case 840, a guide 841, the image reading unit 842, and a spring 843.

The case 840 accommodates the image reading unit 842. The guide 841 is disposed at a position of abutment on a rocking portion 821 which is a portion of the rocking member 812.

The image reading unit 842 irradiates a sheet or a reflectance standard (a white reference member) 85 with light and reads reflected light with an image sensor. The reflectance standard 85 has a shape extending in a direction of extension of the image reading unit 84. The reflectance standard 85 is provided separately from and independently of the image reading unit 842 at a location opposed to an image reading surface of the image sensor of the image reading unit 842. The reflectance standard 85 has such a length that it keeps facing opposite to the image reading surface even when the image reading unit 842 moves to either an initial position or a reading position to read the reflectance standard 85 both of which will be described hereinafter. Image data generated from reflected light of the light applied from the image reading unit 842 to the reflectance standard 85 is used, for example, as white reference data for shading compensation.

An example of the image reading unit 842 is a CIS (contact image sensor) type sensor.

The spring 843 shown in FIG. 7B is a tensile spring, is mounted at one end to the guide 841, and is fixed at the other end to a device body of the sheet conveying device 8. The guide 841 is formed integrally with the case 840. The guide 841 is biased toward pushing the rocking portion 821 by the spring 843.

Next, the transmission device 81 will be described in detail. As described previously, the transmission device 81 includes the planet gear part 811, the rocking member 812, and the lock member 813. As shown in FIG. 8, the drive gear part 810 transmits the driving force of the drive device 80 to the planet gear part 811 (see FIG. 5A), particularly to a planet carrier member 817.

As shown in FIG. 8, the planet carrier member 817 of the planet gear part 811 meshes with the drive gear part 810 and rotates together with a sun gear member 814 in conjunction with the drive gear part 810 being rotated in the same direction as the direction of rotation of the drive device 80 by the rotary driving force of the drive device 80.

The rocking member 812 includes a second cam 820, a rocking shaft 819, and a rocking portion 821. The second cam 820 is formed integrally with the rocking shaft 819 and the rocking portion 821 and rotates simultaneously with the rocking shaft 819 and the rocking portion 821.

As shown in FIG. 4, the rocking member 812 moves, according to the rotation of the planet gear part 811, in the longitudinal direction of the optical unit 84, i.e., in the direction of extension of the rocking shaft 819 and the rocking portion 821.

In a state where the second cam 820 and a first cam 8160 of an internal gear member 816 to be described hereinafter mesh with each other, the case 840 accommodating the image reading unit 842 is biased by the spring 843 to push the rocking portion 821 toward the first cam 8160 and thus located at a reading position to read a sheet in the direction of extension of the rocking portion 821 (the direction of extension of the case 840).

When the rocking portion 821 and the second cam 820 rotate and the second cam 820 is thus displaced and released from meshing engagement with the first cam 8160, the rocking portion 821 moves in the direction of extension thereof and the case 840 moves in a direction away from the first cam 8160 along the direction of extension of the rocking portion 821 against the bias of the spring 843. Hereinafter, this movement of the case 840 is referred to as rocking.

When the rocking portion 821 and the second cam 820 further rotate and the second cam 820 is thus returned to meshing engagement with the first cam 8160, the rocking portion 821 is returned, by the bias of the spring 843, in the direction of extension thereof to a position when the second cam 820 and the first cam 8160 mesh with each other, and the case 840 is returned in the direction of extension of the rocking portion 821 to the above reading position.

The transmission device 81 is designed to keep the rocking member 812 from moving in the above manner when the drive device 80 rotates the conveyance device 83 in the direction of conveyance of a sheet, and allow the rocking member 812 to move in the above manner when the drive device 80 rotates the conveyance device 83 in a direction opposite to the direction of conveyance of a sheet.

The lock member 813 allows the sun gear member 814 to rotate in one direction (a direction of its rotation during conveyance of a sheet), but restrains the rotation of the sun gear member 814 in the direction opposite to the one direction by meshing engagement into the sun gear member 814. An internal gear 8162 of an internal gear member 816 meshes with the lock drive gear part 832.

Specifically, the lock member 813 is designed so that, as shown in FIG. 9B, when the conveying shaft 830 and the lock drive gear part 832 are rotated in the direction of conveyance C of a sheet by the rotary driving force transmitted thereto through the drive gear 810 and the internal gear 8162 from the drive device 80, the lock member 813 is moved in a direction B away from the planet gear part 811 (see FIG. 8) by the rotation of the lock drive gear part 832 in the direction of conveyance C.

Furthermore, the lock member 813 is designed so that, as shown in FIG. 9A, when the conveying shaft 830 and the lock drive gear part 832 are rotated in a direction of reverse conveyance D of a sheet by the rotary driving force from the drive device 80 (in the direction of rotation opposite to that in FIG. 9B), the lock member 813 is moved in a direction A to mesh into the sun gear member 814 (see FIG. 5B) of the planet gear part 811 by the rotation of the lock drive gear part 832 in the direction of reverse conveyance D. At this time, a pawl 8132A of the lock member 813 bites into the sun gear member 814 to restrain the rotation of the sun gear member 814.

Next, a detailed description will be given of the structure of the planet gear part 811 with reference to FIGS. 5A to 5E.

Figure 5A:
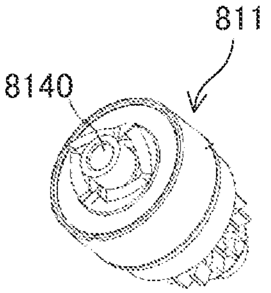
FIGS. 5A to 5E are views showing the structure of a planet gear part of the transmission device.
Figure 5B:
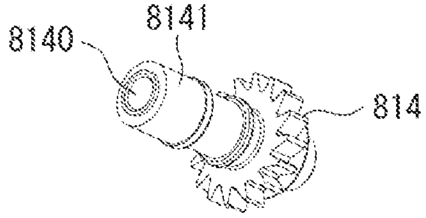
Figure 5C:
Figure 5D:
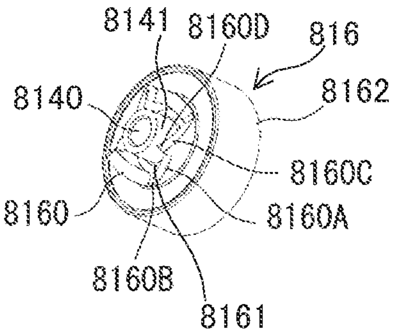
Figure 5E:
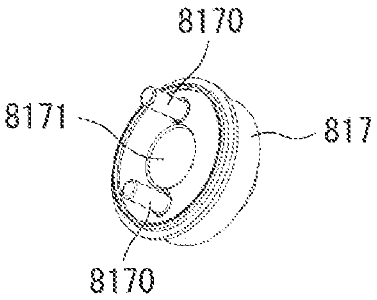

The planet gear part 811 shown in FIG. 5A includes the sun gear member 814 shown in FIG. 5B, planet gear members 815 shown in FIG. 5C, an internal gear member 816 shown in FIG. 5D, and the planet carrier member 817 shown in FIG. 5E.

As shown in FIG. 5B, the sun gear member 814 includes a gear portion and a shaft portion 8141 and the shaft portion 8141 has a through hole 8140 formed therein.

The through hole 8140 of the sun gear member 814 is passed through by the rocking shaft 819 of the rocking member 812 shown in FIG. 7 and is fitted onto the rocking shaft 819. The rocking shaft 819 is held by the sun gear member 814 to rotate simultaneously with the sun gear member 814. FIG. 8 shows a state where the rocking shaft 819 passes through the through hole 8140 of the sun gear member 814.

The internal gear member 816 includes an internal gear 8162, the first cam 8160, and a through hole 8161.

The first cam 8160 shown in FIG. 5D is meshable with the second cam 820 of the rocking member 812 shown in FIG. 7. The internal gear 8162 is formed integrally with the first cam 8160 and rotate simultaneously with the first cam 8160.

As shown in FIG. 5D, the first cam 8160 includes first declivities 8160A, first bottoms 8160B, first acclivities 8160C, and first peaks 8160D.

The first declivity 8160A inclines in a direction toward the internal gear 8162. More specifically, the first declivity 8160A inclines toward the internal gear 8162 from the first peak 8160D and inclines toward the first bottom 8160B.

At the first bottoms 8160B, the first declivities 8160A come closest to the internal gear 8162.

The first acclivity 8160C inclines, starting with the first bottom 8160B, in a direction away from the internal gear 8162. In other words, the first acclivity 8160C inclines, starting with the first bottom 8160B, toward the first peak 8160D.

At the first peaks 8160D, the first acclivities 8160C come farthest away from the internal gear 8162.

The planet carrier member 817 shown in FIG. 5E meshes with the drive gear part 810 of the drive device 80 and is rotated by the rotary driving force of the motor transmitted by the drive gear part 810. The planet carrier member 817 includes carrier shafts 8170 and has a through hole 8171 formed therein.

The shaft portion 8141 of the sun gear member 814 is inserted through the respective through holes 8161, 8171 of the internal gear member 816 and the planet carrier member 817 and the internal gear member 816 and the planet carrier member 817 are fitted with play around the shaft portion 8141. The planet gear members 815 shown in FIG. 5C are disposed around the outer periphery of the shaft portion 8141 formed coaxially with the sun gear member 814. The internal gear member 816 is disposed to surround the planet gear members 815 and meshes with the planet gear members 815. Specifically, the carrier shafts 8170 of the planet carrier member 817 pass through the planet gear members 815 and the planet gear members 815 on the carrier shafts 8170 mesh with the internal gear member 816. More specifically, the planet gear members 815 mesh with the gear (the internal gear 8162) formed on the inner peripheral wall of the internal gear member 816, the rotation of the planet carrier member 817 is thus shifted and transmitted to the internal gear member 816, and the internal gear member 816 is thus rotated simultaneously with the planet carrier member 817.

When the rotation of the sun gear member 814 is restrained by the lock member 813, the internal gear member 816 is rotated through the planet carrier member 817 and the planet gear members 815 by the driving force of the drive device 80.

Since the planet carrier member 817 and the internal gear member 816 are fitted with play around the shaft portion 8141 of the sun gear member 814, the sun gear member 814 holds the planet carrier member 817 and the internal gear member 816 freely rotatable with respect to the shaft portion 8141. In other words, the planet carrier member 817 and the internal gear member 816 rotate independently of the sun gear member 814.

Next, the rocking member 812 will be described in detail with reference to FIG. 7A.

The rocking member 812 presses against the guide 841 of the optical unit 84 and moves in the direction of extension of the case 840 together with the guide 841 of the optical unit 84.

As shown in FIG. 7A, the rocking member 812 includes the rocking shaft 819, the second cam 820, the rocking portion 821, and a rotation restricting portion 824. The rocking portion 821 has a shaft-like shape and extends coaxially with the rocking shaft 819. The rocking portion 821 and the rocking shaft 819 are examples of the "rocking shaft" defined in CLAIMS. The rocking shaft 819, the second cam 820, and the rocking portion 821 are formed integrally and rotate simultaneously about the same axis. A gear-side end portion 822 which is a distal end portion of the rocking shaft 819 is held, in an unshown bearing member supported on a housing of the document sheet conveying device 4, movably in the axial direction (a direction of extension of the rocking shaft 819, i.e., a direction orthogonal to the direction of conveyance of a sheet). A guide-side end portion 823 which is a distal end portion of the rocking portion 821 abuts on the guide 841. The rotation restricting portion 824 has the shape of a rib and is formed on the peripheral surface of the rocking portion 821 to project radially from the peripheral surface. The rocking portion 821 and the rocking shaft 819 are restricted from rotating about their axis by engagement of the rotation restricting portion 824 with an unshown engaging portion provided on the guide 841.

The rocking member 812 includes the second cam 820 facing opposite to the first cam 8160 disposed coaxially with the rocking shaft 819. The second cam 820 is formed integrally with the rocking shaft 819 of the rocking member 812. The rocking shaft 819 of the rocking member 812 passes through the through hole 8140 of the sun gear member 814 constituting part of the planet gear part 811 and is fitted and mounted in the through hole 8140. Thus, the rocking member 812 rotates simultaneously with the sun gear member 814.

The second cam 820 faces opposite to the first cam 8160 (see FIG. 5D) of the internal gear member 816 disposed in the planet gear part 811.

The second cam 820 of the rocking member 812 includes second acclivities 8200, second peaks 8201, second declivities 8202, and second bottoms 8203.

The second acclivity 8200 inclines in a direction toward the gear-side end portion 822. The second acclivity 8200 of the second cam 820 is formed to extend while inclining, starting with the second bottom 8203 to the second peak 8201, in a direction toward the gear-side end portion 822.

The second peaks 8201 are located where the second acclivities 8200 come closest to the gear-side end portion 822. More specifically, the second peaks 8201 are located where the second acclivities 8200 come closest to the gear-side end portion 822 in the axial direction of the rocking shaft 819.

The second declivity 8202 inclines, starting with the second peak 8201, in a direction toward the guide-side end portion 823. The second declivity 8202 of the second cam 820 is formed to extend while inclining, starting with the second peak 8201 to the second bottom 8203, in a direction toward the guide-side end portion 823.

The second bottoms 8203 are located where the second declivities 8202 come closest to the guide-side end portion 823. More specifically, the second bottoms 8203 are located where the second declivities 8202 come closest to the guide-side end portion 822 in the axial direction of the rocking shaft 819.

When the internal gear member 816 of the planet gear part 811 rotates while, as described above, the pawl 8132A of the lock member 813 bites into the sun gear member 814 to restrain the rotation of the sun gear member 814, the rocking member 812 does not rotate, but the internal gear member 816 rotates, which displaces the meshing engagement between the second cam 820 and the first cam 8160. Therefore, the rocking member 812 moves in a direction toward the guide 841 to allow the rocking portion 821 to push the guide 841 in the direction of extension of the rocking portion 821 and the rocking shaft 819, which causes the optical unit 84 to rock in this direction.

In this embodiment, the sum of the axial distance from the first bottom 8160B of the first cam 8160 of the internal gear member 816 to the first peak 8160D thereof and the axial distance from the second bottom 8203 of the second cam 820 of the rocking member 812 to the second peak 8201 thereof is set at 4 mm or less. This sum corresponds to the amount of rocking of the optical unit 84. By specifying the figures of the first cam 8160 and the second cam 820 as so far described, the amount of rocking of the optical unit 84 can be adjusted.

When the conveyance device 83 is rotated in the direction of conveyance of a sheet by the rotary driving force from the drive device 80, the first declivities 8160A, the first bottoms 8160B, the first acclivities 8160C, and the first peaks 8160D of the first cam 8160 mesh with the second acclivities 8200, the second peaks 8201, the second declivities 8202, and the second bottoms 8203, respectively, of the second cam 820.

Next, the lock member 813 will be described in detail with reference to FIGS. 6A to 6E.

Figure 6A:
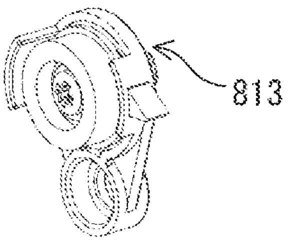
FIGS. 6A to 6E are views showing the structure of a lock member of the transmission device.
Figure 6B:
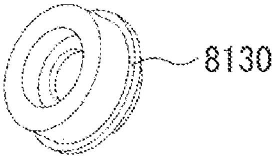
Figure 6C:
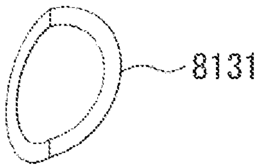
Figure 6D:
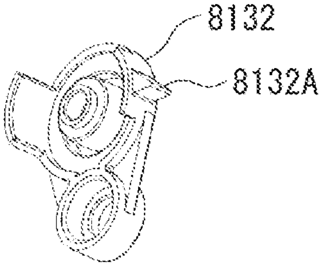
Figure 6E:
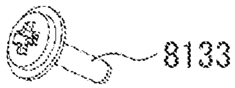

The lock member 813 shown in FIG. 6A includes a lock gear 8130 shown in FIG. 6B, a washer 8131 shown in FIG. 6C, a connector 8132 shown in FIG. 6D, and a screw 8133 shown in FIG. 6E. The lock member 813 is assembled by mounting the lock gear 8130, the washer 8131, and the screw 8133 to the connector 8132.

As shown in FIG. 9A, the lock gear 8130 of the lock member 813 meshes with the lock drive gear part 832 of the conveying shaft 830. When the lock drive gear part 832 is rotated by the rotary driving force from the drive device 80, the lock gear 8130 rotates.

The washer 8131 is incorporated into the lock gear 8130. The washer 8131 functions as a resistant for the lock gear 8130 against the connector 8132. The connector 8132 is assembled with the lock gear 8130 and the washer 8131 by the screw 8133.

The connector 8132 includes a pawl 8132A. When, as shown in FIG. 8, the pawl 8132A of the lock member 813 bits into the gear of the sun gear member 814 of the planet gear part 811, the pawl 8132A restrains the rotation of the sun gear member 814.

Next, the movement of the sheet conveying device 8 will be described with reference to, in addition to FIGS. 9A and 9B, FIGS. 10A to 15C.

Figure 10A:
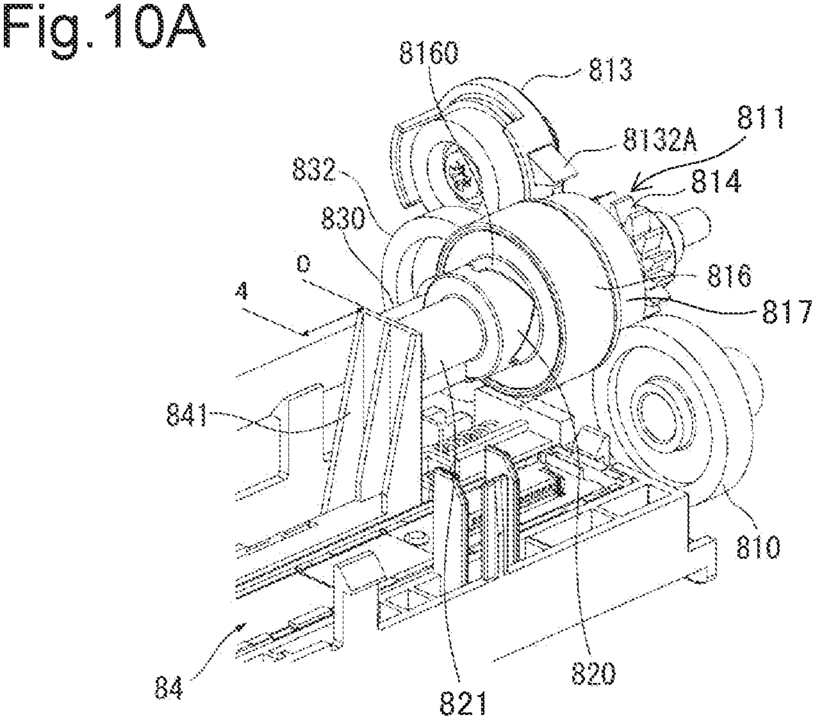
FIGS. 10A and 10B are views showing the relationship between the lock member and the planet gear part of the transmission device.
Figure 10B:
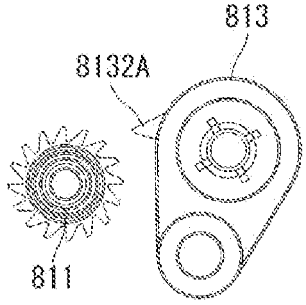

FIGS. 10A and 10B are views showing the relationship between the lock member 813 and the planet gear part 811 of the transmission device 81. FIGS. 11A to 15C are views showing the relationship between the lock member 813 and the planet gear part 811 of the transmission device 81 and the amount of movement of the rocking shaft 819.

As shown in FIG. 4, during conveyance of a sheet, the planet carrier member 817 is rotated through the drive gear part 810 by the driving force of the motor rotating forward (in the direction of rotation in supplying the rotary driving force during conveyance of a sheet) supplied from the drive device 80. At this time, as shown in FIG. 10A, the first cam 8160 of the planet gear part 811 and the second cam 820 of the rocking member 812 mesh with each other. In the planet gear part 811, the sun gear member 814, the planet gear members 815, the planet carrier member 817, and the internal gear member 816 rotate.

At this time, as shown in FIG. 9B, the conveying shaft 830 and the lock drive gear part 832 rotate in the direction of conveyance C. The conveying shaft 830 passes through a through hole provided in the connector 8132 of the lock member 813 and, thus, the connector 8132 is fitted with play freely rotatably around the conveying shaft 830. When the lock gear 8130 meshing with the lock drive gear part 832 is rotated in the direction of the arrow E by the above rotation of the lock drive gear part 832, the rotation of the lock gear 8130 is instantaneously restricted by the resistance of the washer 8131 (see FIG. 6C) and at this time the connector 8132 rotates to incline in the direction of the arrow B.

Thus, the lock member 813 moves away in the direction of the arrow B from the planet gear part 811 (see FIG. 8) and, as shown in FIGS. 10A and 10B, the pawl 8132A of the lock member 813 is disengaged and separated from the planet gear part 811. As shown in FIG. 10A, the first cam 8160 of the planet gear part 811 and the second cam 820 of the rocking member 812 mesh with each other. The rocking portion 821 of the rocking member 812 abuts on the guide 841 of the optical unit 84. The spring 843 biases the guide 841 of the optical unit 84 against the guide-side end portion 823 of the rocking portion 821. In this state, the image reading unit 842 of the optical unit 84 is in a sheet reading position (initial position).

Next, a description will be given of movement in performing shading compensation for the image reading unit 842 while no sheet is conveyed. In this case, a rotary driving force in a direction reverse to the forward rotation is supplied from the drive device 80 through the drive gear part 810 to the planet carrier member 817 and thus causes the planet carrier member 817 and the internal gear member 816 to rotate reversely to the direction of rotation during conveyance of a sheet. At the start of this reverse rotation, in the planet gear part 811, the sun gear member 814, the planet gear members 815, the planet carrier member 817, and the internal gear member 816 rotate reversely to the direction of rotation during conveyance of a sheet.

At this time, as shown in FIG. 9A, by the supply of the rotary driving force of reverse rotation from the drive device 80, the conveying shaft 830 and the lock drive gear part 832 start to rotate in the direction of reverse conveyance D opposite to the direction of conveyance during conveyance of a sheet. When the lock gear 8130 is rotated in the direction of the arrow F by the rotation of the lock drive gear part 832, the rotation of the lock gear 8130 is instantaneously restricted by the resistance of the washer 8131 and at this time the connector 8132 rotates to incline in the direction of the arrow A.

Figure 11A:
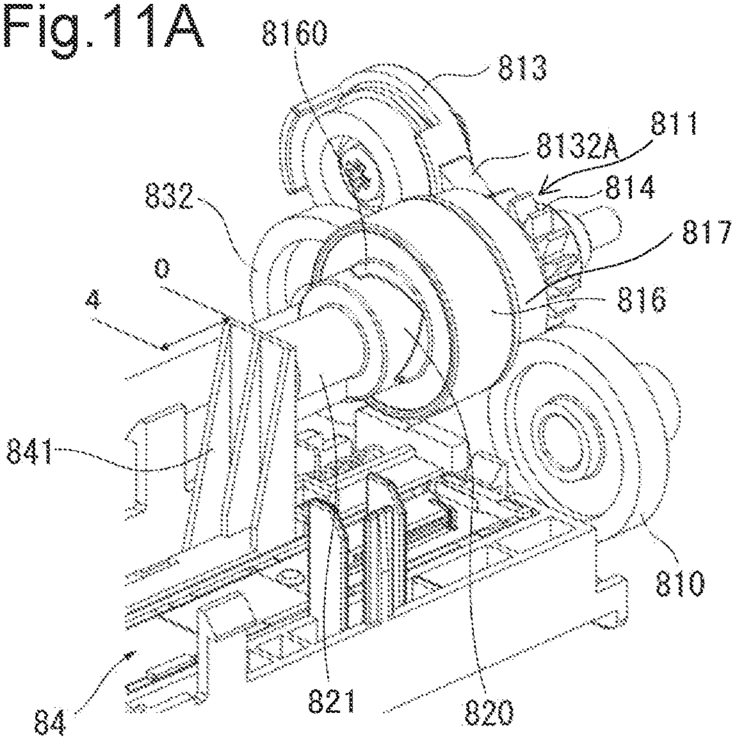
FIGS. 11A to 11C are views showing the relationship between the lock member and the planet gear part of the transmission device and the amount of movement of a rocking shaft.
Figure 11B:
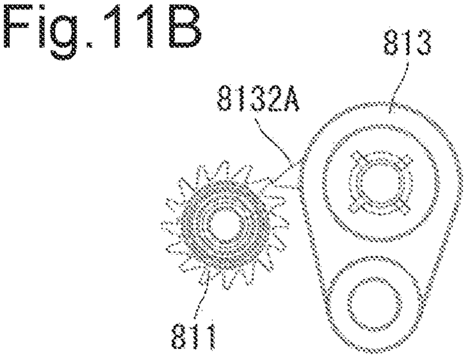

Thus, the lock member 813 moves in the direction of the arrow A and close to the planet gear part 811 and, as shown in FIG. 11B, the pawl 8132A of the lock member 813 engages with the planet gear part 811. Therefore, in the planet gear part 811, the rotation of the sun gear member 814 is restrained. Thus, only the planet gear members 815, the planet carrier member 817, and the internal gear member 816 shown in FIGS. 5C to 5E rotate.

Since the internal gear member 816 rotates as just described, as shown in FIG. 11A, the first cam 8160 of the planet gear part 811 also rotates and is displaced slightly from meshing engagement with the second cam 820 of the rocking member 812.

Figure 11C:
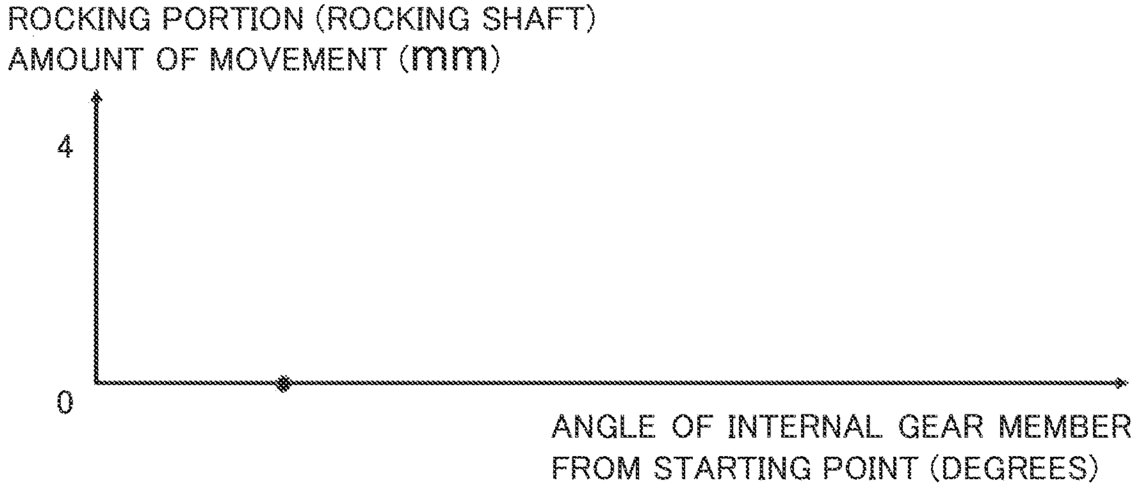

At the time when the internal gear member 816 rotates in the above manner, as shown in FIG. 11C, the image reading unit 842 of the optical unit 84 does not substantially shift from the sheet reading position (initial position). The amount of movement of the rocking shaft 819 from the sheet reading position is substantially 0 (mm). The respective amounts of movement of the guide 841 and the image reading unit 842 from the sheet reading position are also substantially 0 (mm).

Suppose that, in the planet gear part 811, the planet gear members 815, the internal gear member 816, and the planet carrier member 817 continue to rotate. The rotation of the sun gear member 814 remains restrained.

At this time, since the conveying shaft 830 and the lock drive gear part 832 continue to be rotated in the direction of reverse conveyance D by the rotary driving force of reverse rotation supplied from the drive device 80, they move closer to the planet gear part 811.

Figure 12A:
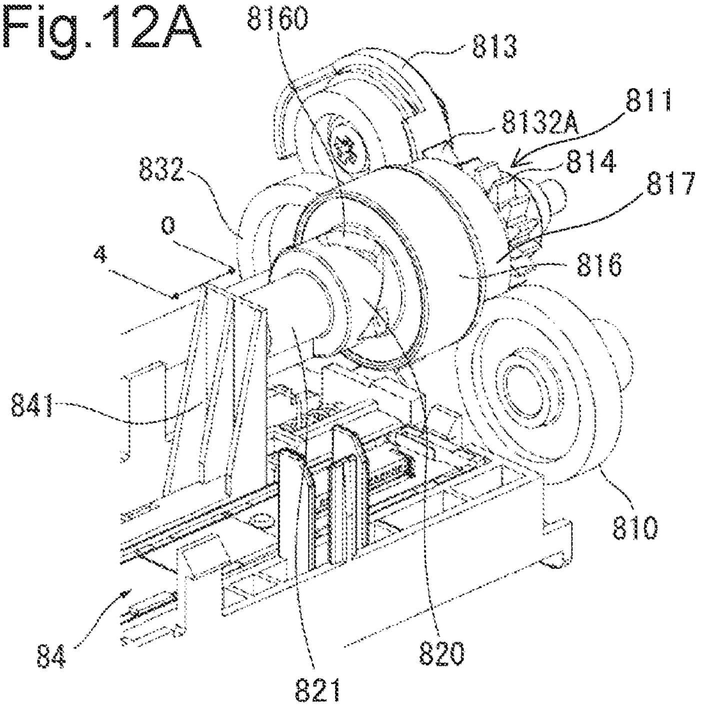
FIGS. 12A to 12C are views showing the relationship between the lock member and the planet gear part of the transmission device and the amount of movement of the rocking shaft.
Figure 12B:
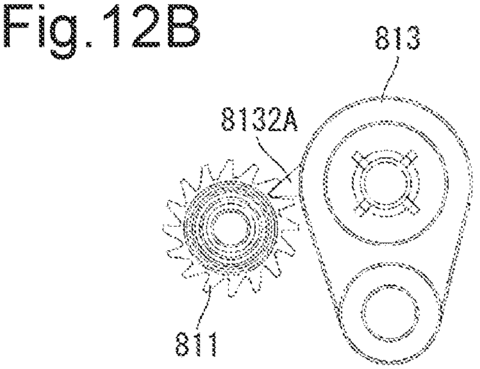

Thus, as shown in FIG. 12B, the pawl 8132A of the lock member 813 bites into the teeth of the planet gear part 811. By the rotation of the internal gear member 816 and the first cam 8160, the second cam 820 of the rocking member 812 moves in a direction away from the first cam 8160 as shown in FIG. 12A. In this case, as shown in FIG. 12C, the internal gear member 816 of the planet gear part 811 rotates, for example, 30 degrees from the sheet reading position (initial position) and, as shown in FIG. 12A, the first cam 8160 of the planet gear part 811 is further displaced from meshing engagement shown in FIG. 11A with the second cam 820 of the rocking member 812.

At this time, the spring 843 always biases the guide 841 of the optical unit 84 against the guide-side end portion 823 of the conveying shaft 830, but the rocking portion 821 and the rocking shaft 819 of the rocking member 812 are moved toward the guide 841 against the bias of the spring 843 by the above rotation of the first cam 8160 while abutting on the guide 841 of the optical unit 84, thus presses the guide 841, and moves it in the direction of pressing.

Figure 12C:
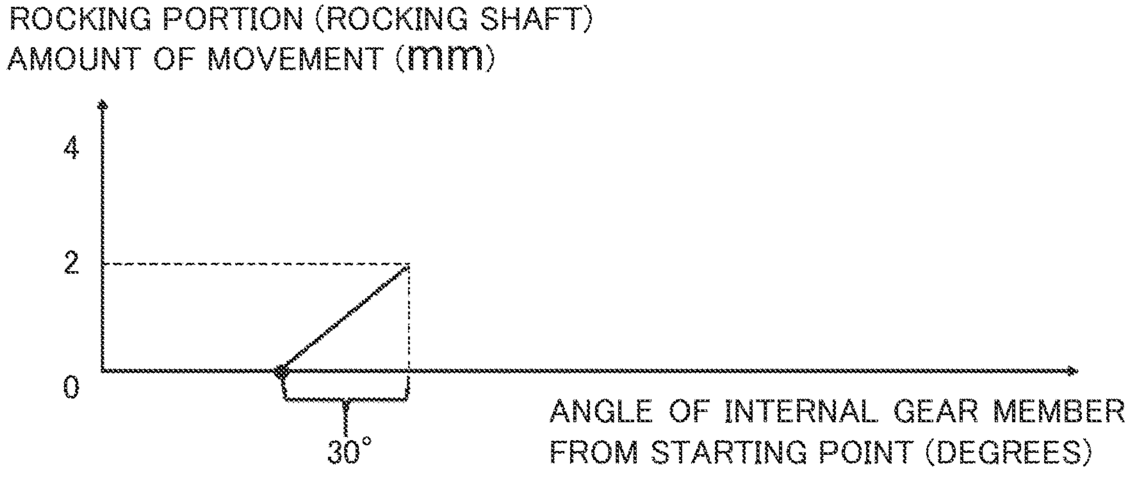

Therefore, as shown in FIG. 12C, the image reading unit 842 of the optical unit 84 rocks an amount of above-described movement of the rocking portion 821 in the direction of extension of the conveying shaft 830 (the direction orthogonal to the direction of conveyance of a sheet) from the sheet reading position (initial position). In this embodiment, an example is shown where the amount of movement of the rocking portion 821 from the sheet reading position due to the rocking as described above is 2 (mm). The respective amounts of movement of the guide 841 and the image reading unit 842 from the sheet reading position are also 2 (mm).

A description will be given below of the case where, in the planet gear part 811, the planet gear members 815, the internal gear member 816, and the planet carrier member 817 further continue to rotate from the above state.

The rotation of the sun gear member 814 remains restrained. As shown in FIG. 13B, the pawl 8132A of the lock member 813 keeps biting into the teeth of the planet gear part 811.

Figure 13A:
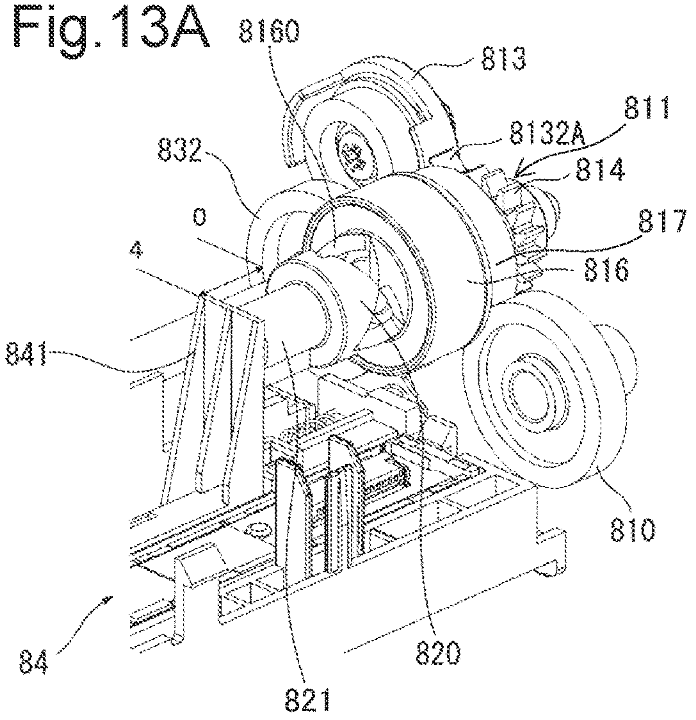
FIGS. 13A to 13C are views showing the relationship between the lock member and the planet gear part of the transmission device and the amount of movement of the rocking shaft.
Figure 13B:
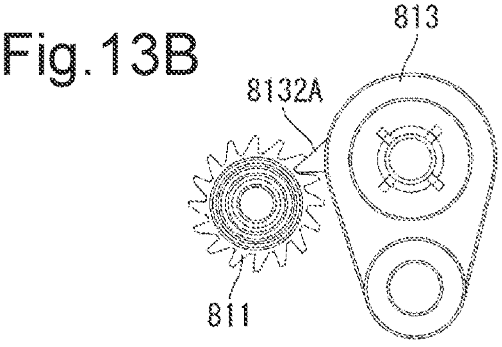
Figure 13C:
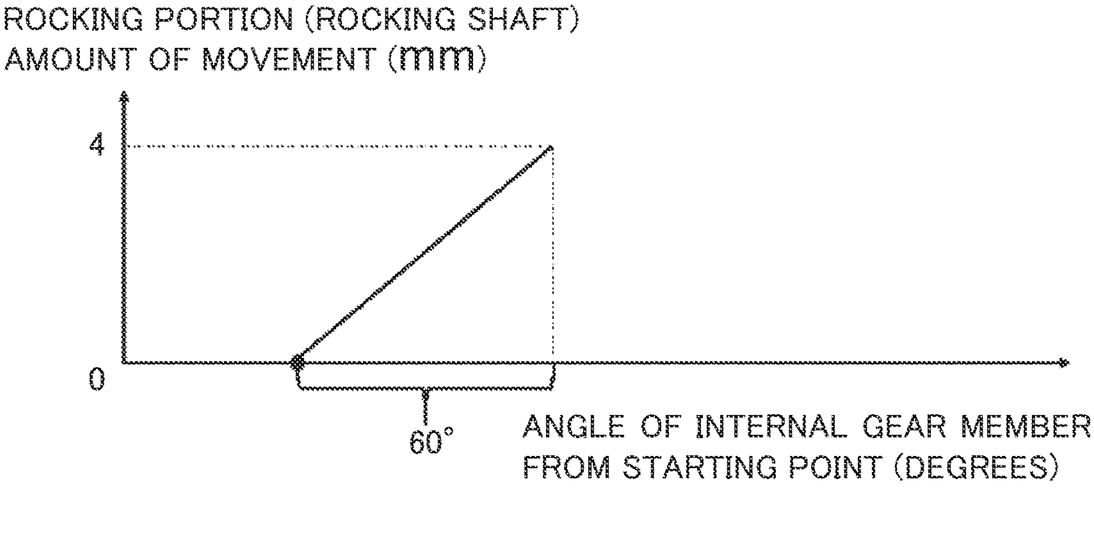

As shown in FIG. 13C, the internal gear member 816 of the planet gear part 811 rotates, for example, 60 degrees from the sheet reading position (initial position) and, as shown in FIG. 13A, the first cam 8160 of the planet gear part 811 is displaced more largely from meshing engagement with the second cam 820 of the rocking member 812. The rocking portion 821 of the rocking member 812 further moves toward the guide 841 of the optical unit 84 and thus further moves the guide 841 against the bias of the spring 843.

In this embodiment, as shown in FIG. 13C, an example is shown where, at this time, the amount of movement of the rocking portion 821 from the sheet reading position due to the rocking as described above is 4 (mm). The respective amounts of movement of the guide 841 and the image reading unit 842 from the sheet reading position are also 4 (mm). In this embodiment, this position after the movement is set as a position for the image reading unit 842 of the optical unit 84 to read a reflectance standard 85. At this reading position, the image reading unit 842 reads the reflectance standard 85 to acquire white reference data for use in shading compensation.

A description will be given below of the case where, in the planet gear part 811, the planet gear members 815, the internal gear member 816, and the planet carrier member 817 further continue to rotate from the above state.

The rotation of the sun gear member 814 remains restrained. As shown in FIG. 14B, the pawl 8132A of the lock member 813 keeps biting into the teeth of the planet gear part 811.

Figure 14A:
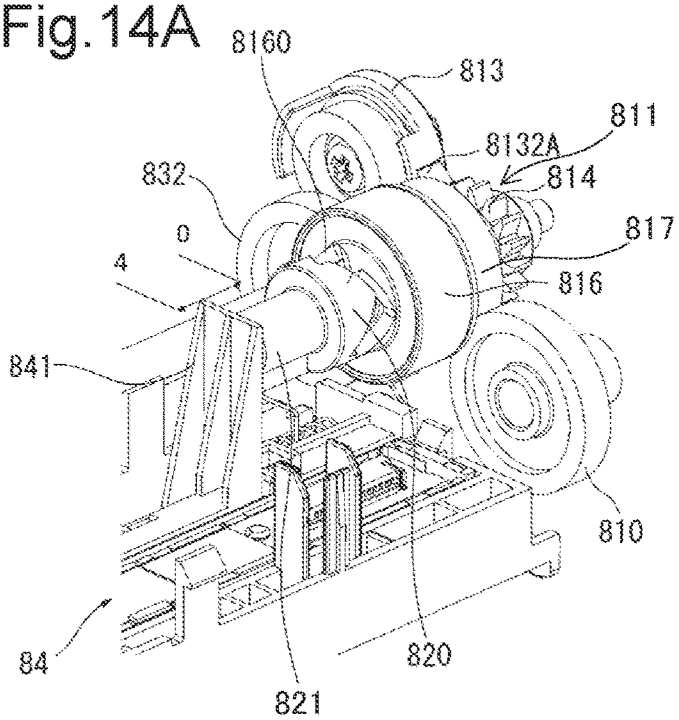
FIGS. 14A to 14C are views showing the relationship between the lock member and the planet gear part of the transmission device and the amount of movement of the rocking shaft.
Figure 14B:
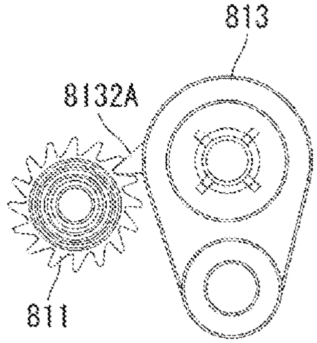
Figure 14C:
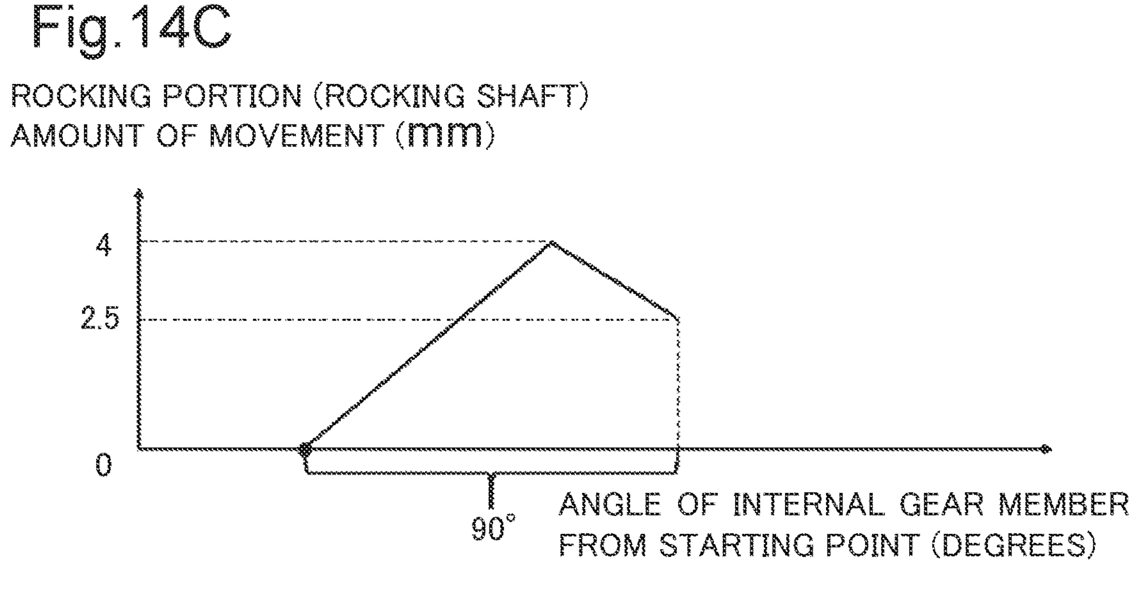

At this time, as shown in FIG. 14C, the planet gear part 811 rotates, for example, 90 degrees from the initial position and, as shown in FIG. 14A, the first peaks 8160D (see FIG. 5D) of the first cam 8160 of the planet gear part 811 pass over the second peaks 8201 of the second cam 820 of the rocking member 812.

Thus, the rocking portion 821 and the rocking shaft 819 of the rocking member 812 start to move in a direction away from the guide 841 of the optical unit 84 and the guide 841 is moved, by the bias of the spring 843, in a direction of movement of the rocking portion 821 and the rocking shaft 819 together with the rocking portion 821 and the rocking shaft 819.

Therefore, the image reading unit 842 of the optical unit 84 moves from the position to read the reflectance standard 85 toward the sheet reading position. In this embodiment, as shown in FIG. 14C, an example is shown where, at this time, the amount of movement of the rocking shaft 819 from the sheet reading position is 2.5 (mm). The respective amounts of movement of the guide 841 and the image reading unit 842 from the sheet reading position are also 2.5 (mm).

A description will be given below of the case where, in the planet gear part 811, the planet gear members 815, the internal gear member 816, and the planet carrier member 817 further continue to rotate from the above state.

The rotation of the sun gear member 814 remains restrained. As shown in FIG. 15B, the pawl 8132A of the lock member 813 keeps biting into the teeth of the planet gear part 811.

Figure 15A:
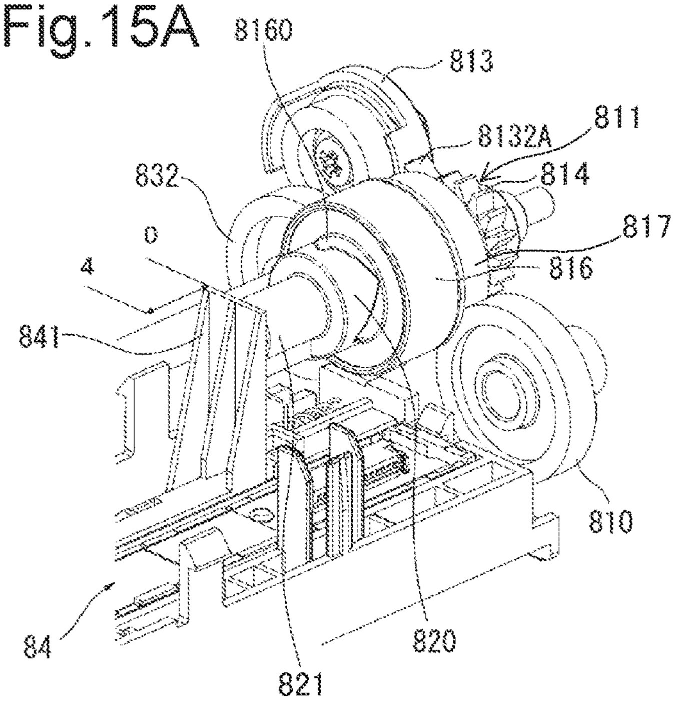
FIGS. 15A to 15C are views showing the relationship between the lock member and the planet gear part of the transmission device and the amount of movement of the rocking shaft.
Figure 15B:
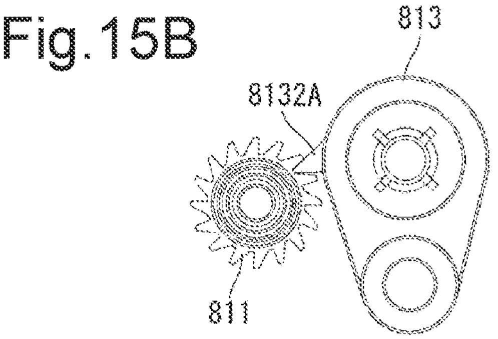
Figure 15C:
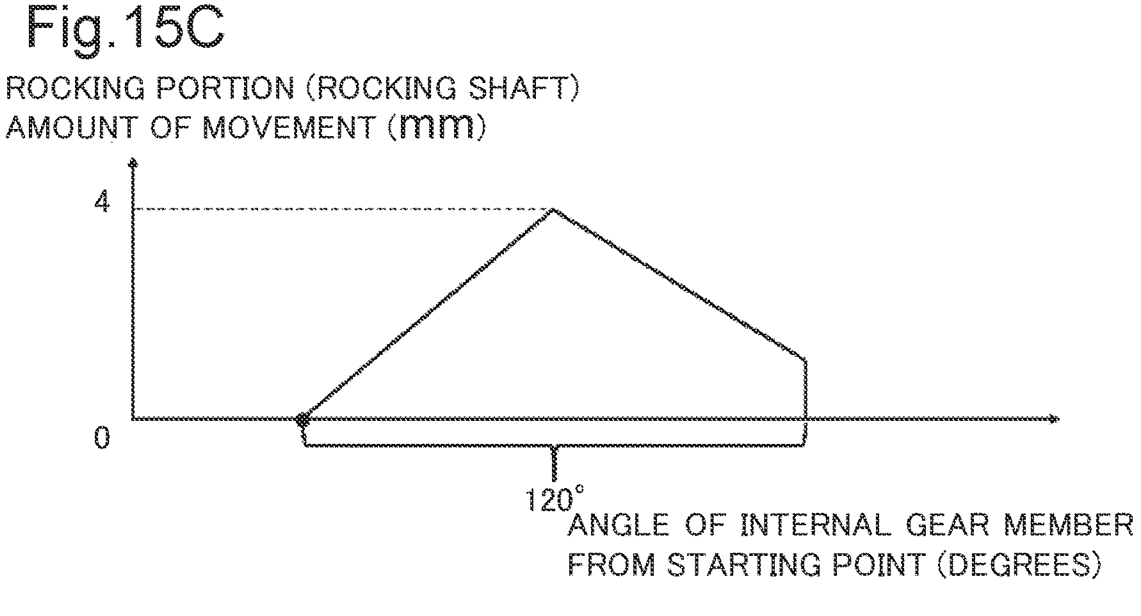

At this time, as shown in FIG. 15C, the planet gear part 811 rotates, for example, 120 degrees from the initial position and, as shown in FIG. 15A, the first cam 8160 of the planet gear part 811 meshes again with the second cam 820 of the rocking member 812.

Thus, the rocking portion 821 and the rocking shaft 819 of the rocking member 812 further move along their axis in a direction away from the guide 841 of the optical unit 84 and the guide 841 is moved, by the bias of the spring 843, in the direction of movement of the rocking portion 821 and the rocking shaft 819 together with the rocking portion 821 and the rocking shaft 819.

At this time, the image reading unit 842 of the optical unit 84 returns to the sheet reading position. As shown in FIG. 15C, the amount of movement of the rocking shaft 819 from the sheet reading position (initial position) is 0 (mm). The respective amounts of movement of the guide 841 and the image reading unit 842 from the sheet reading position are also 0 (mm).

In accordance with this embodiment, the optical unit 84 is rocked with respect to the reflectance standard 85 and the image reading unit 842 reads the reflectance standard 85 at the position to read the reflectance standard 85. Therefore, although reading of the reflectance standard 85 at the initial position might cause dirt or the like on the reflectance standard 85 to be read, resulting in failure to acquire proper white reference data, the reflectance standard 85 can be read away from its region where dirt or the like is present and thus acquire proper white reference data.

In accordance with this embodiment, by changing the direction of rotation of the rotary driving force supplied from the drive device 80, the image reading unit 842 can be moved between the initial position and the position to read the reflectance standard 85. Therefore, in this embodiment, the image reading unit 842 can be returned to the initial position (sheet reading position) after shading compensation.

The description of the embodiment of the present disclosure has so far been given with reference to the drawings. However, the present disclosure is not limited to the above embodiment and can be implemented in various forms without departing from the gist of the present disclosure. For the sake of ease of understanding, the drawings may be schematic representation, primarily of components. The number of components and so on shown in the drawings may be different from those of actual components for convenience of creation of the drawings. The components described in the above embodiment are merely illustrative, not particularly limited, and can be changed variously without substantially departing from the effects of the present disclosure.

INDUSTRIAL APPLICABILITY

The present disclosure is applicable to the field of sheet conveying devices.

While the present disclosure has been described in detail with reference to the embodiments thereof, it would be apparent to those skilled in the art the various changes and modifications may be made therein within the scope defined by the appended claims.

What is claimed is:

1. A sheet conveying device comprising:

a drive device that generates a rotary driving force;

a conveyance device that conveys a sheet by the rotary driving force of the drive device;

an optical unit including an image reading unit that extends in a longitudinal direction thereof along a widthwise direction orthogonal to a direction of conveyance of the sheet, applies light to the sheet, and reads light reflected from the sheet with an image sensor;

a white reference member that extends in the longitudinal direction of the image reading unit and is read by the image reading unit; and a transmission device that transmits the driving force generated by the drive device to rock the optical unit in the widthwise direction, the transmission device comprising a rocking member that rocks the optical unit in a longitudinal direction of the optical unit and a first cam, wherein the rocking member comprises:

a rocking shaft extending in the longitudinal direction;

a rocking portion fixed to the rocking shaft and configured to contact the optical unit; and a second cam fixed to the rocking shaft and engageable with the first cam, wherein the first cam and the second cam are configured to generate an axial displacement by relative rotational motion between the first cam and the second cam caused by the rotary driving force, wherein the rocking shaft is configured to reciprocate in an axial direction in accordance with the axial displacement, whereby the rocking portion causes the optical unit to reciprocate in the longitudinal direction, wherein the drive device is configured to generate the rotary driving force for both the conveyance device and the transmission device by a single driving source, wherein, when the drive device supplies the rotary driving force in a first direction, the rotary driving force is transmitted to the conveyance device in a state in which reciprocating movement of the rocking shaft is suppressed, wherein, when the drive device supplies the rotary driving force in a second direction opposite to the first direction, the rotary driving force is transmitted to the rocking member such that the rocking shaft reciprocates in the axial direction.

2. The sheet conveying device according to claim 1, wherein the image reading unit is a CIS-type sensor.

3. A sheet conveying device comprising:

a drive device that generates a driving force;

a conveyance device that conveys a sheet by a rotary driving force of the drive device;

an optical unit including an image reading unit that extends in a longitudinal direction thereof along a widthwise direction orthogonal to a direction of conveyance of the sheet, applies light to the sheet, and reads light reflected from the sheet with an image sensor;

a white reference member that extends in the longitudinal direction of the image reading unit and is read by the image reading unit; and a transmission device that transmits the driving force generated by the drive device to rock the optical unit in the widthwise direction, the transmission device comprising a rocking member that rocks the optical unit in a longitudinal direction of the optical unit, wherein the transmission device comprises a planet gear part including:

a sun gear member;

a planet carrier member rotatable by the driving force of the drive device;

a planet gear member mounted to the planet carrier member; and an internal gear member disposed to surround the planet gear member and meshing with the planet gear member, the planet carrier member and the internal gear member are mounted freely rotatably to the sun gear member, the transmission device further comprises a lock member that restrains rotation of the sun gear member depending on the direction of rotation of the rotary driving force supplied from the drive device, the internal gear member comprises a first cam, the rocking member comprises:

a rocking shaft that passes through the sun gear member of the planet gear part and rotates simultaneously with the sun gear member; and a second cam formed on the rocking shaft to face opposite to the first cam, when the rotation of the sun gear member is restrained by the lock member, the internal gear member is rotated together with the planet carrier member and the planet gear member by the driving force of the drive device, and when the internal gear member rotates, the second cam of the rocking member is displaced from meshing engagement with the first cam and the rocking member thus rocks the optical unit.

4. The sheet conveying device according to claim 3, wherein the first cam of the internal gear member comprises:

a first declivity that inclines in a direction toward the internal gear member;

a first bottom at which the first declivity comes closest to the internal gear member;

a first acclivity that inclines, starting from the first bottom, in a direction away from the internal gear member; and a first peak at which the first acclivity comes farthest away from the internal gear member, the rocking member comprises:

a gear-side end portion passing through the planet gear part; and a guide-side end portion located on a side of the rocking member opposite to the gear-side end portion, the second cam of the rocking member comprises:

a second acclivity that inclines in a direction toward the gear-side end portion;

a second peak at which the second acclivity comes closest to the gear-side end portion;

a second declivity that inclines, starting from the second peak, in a direction toward the guide-side end portion; and a second bottom at which the second declivity comes closest to the guide-side end portion, and a sum of an axial distance from the first bottom to the first peak of the first cam and an axial distance from the second bottom to the second peak of the second cam is a distance between which the rocking member rocks the optical unit.

5. The sheet conveying device according to claim 3, wherein the first cam of the internal gear member comprises:

a first declivity that inclines in a direction toward the internal gear member;

a first bottom at which the first declivity comes closest to the internal gear member;

a first acclivity that inclines, starting from the first bottom, in a direction away from the internal gear member; and a first peak at which the first acclivity comes farthest away from the internal gear member, the rocking member comprises:

a gear-side end portion passing through the planet gear part; and a guide-side end portion located on a side of the rocking member opposite to the gear-side end portion, the second cam of the rocking member comprises:

a second acclivity that inclines in a direction toward the gear-side end portion;

a second peak at which the second acclivity comes closest to the gear-side end portion;

a second declivity that inclines, starting from the second peak, in a direction toward the guide-side end portion; and a second bottom at which the second declivity comes closest to the guide-side end portion, the first declivity, the first bottom, the first acclivity, and the first peak are capable of meshing engagement with the second acclivity, the second peak, the second declivity, and the second bottom, respectively, and the meshing engagement is displaced and released by rocking of the rocking member.

6. The sheet conveying device according to claim 3, wherein the rocking member comprises the second cam disposed thereon, a spring at one end connected to the optical unit is anchored to the optical unit, the optical unit comprises a guide formed to be abuttable on the rocking shaft, the guide is biased against the rocking shaft by the spring, and when the internal gear member rotates, the second cam is displaced from the meshing engagement with the first cam and the rocking shaft thus rocks the optical unit through the guide.

7. The sheet conveying device according to claim 6, wherein when the second cam is displaced from the meshing engagement with the first cam, the image reading unit rocks, and when the second cam meshes again with the first cam, the image reading unit returns to a position to read the sheet.

* * * * *